United States Patent [19]
Smith

[11] 3,820,000
[45] June 25, 1974

[54] METHOD AND TRANSFORMER/MOTOR FOR CHARGING BATTERIES

[75] Inventor: Stephen Hagar Smith, San Pedro, Calif.

[73] Assignee: McCullough Corporation, Los Angeles, Calif.

[22] Filed: July 11, 1973

[21] Appl. No.: 378,046

[52] U.S. Cl............... 320/2, 307/149, 310/148, 320/5, 336/182, 318/139
[51] Int. Cl............. H02j 7/02, H02m 5/00
[58] Field of Search ............ 318/538–542, 318/138, 139; 310/176, 68 D, 148, 229–230; 336/115, 116, 122, 123, 182, 183, 229; 307/149, 151, 156; 320/2, 51, 56, 20, 57, 61, 5, 8; 323/13

[56] References Cited
UNITED STATES PATENTS
| | | | |
|---|---|---|---|
| 1,501,558 | 7/1924 | Hunt | 318/541 X |
| 2,702,867 | 2/1955 | Wightman | 336/182 X |
| 3,586,954 | 6/1971 | Carves | 320/56 X |

*Primary Examiner*—J. D. Miller
*Assistant Examiner*—Robert J. Hickey
*Attorney, Agent, or Firm*—Burns, Doane, Swecker & Mathis

[57] ABSTRACT

Method and apparatus for utilizing the windings of a battery powered motor to charge the battery from an alternating current source. The effective electrical connection of the armature brushes is modified from a position encircling a minimum of the electromagnetic flux through the armature to a position encircling a maximum of the electromagnetic flux through the armature. The armature and field windings of the motor are thereafter utilized as a transformer to inductively couple energy from the alternating current source to the battery to effect the charging thereof. A square motor case is preferred to reduce the resistance losses in the windings and to increase flux coupling. Brush friction losses are reduced as light loads by varying brush pressure as a function of load current.

32 Claims, 10 Drawing Figures

METHOD AND TRANSFORMER/MOTOR FOR CHARGING BATTERIES

BACKGROUND OF THE INVENTION

The present invention relates to method and apparatus for utilizing the windings of an electric motor as a transformer for battery charging purposes.

The use of electric powered motors is becoming increasingly prevalent for countless appliances and tools and the requirement for portability and freedom from the restrictions of an electrical connector dictates the utilization of a storage battery as the source of electricity. For such usage, the storage battery must necessarily be incorporated into the structure of the appliance or tool and, upon the exhaustion of the current stored therein, the battery must be recharged.

The removal of the battery may be difficult and time-consuming due to the structural arrangement of the appliance or tool which is designed for minimum space requirements. Moreover, the charging of the battery from the typical alternating current source of electrical energy requires the use of a transformer and the inclusion of the transformer into the structure of the appliance or tool is, in most cases, prohibited by the necessary increase in both size and weight.

One known approach to the problem is disclosed in the Von Delden U.S. Pat. No. 3,321,688 issued May 23, 1967, in which a universal motor is driven either by a battery or an alternating current source. While driven by the alternating current source, the battery may be charged through the utilization of an auxiliary winding. This approach is deficient in that the appliance or tool must be operated to effect charging of the battery and the portability of the device is also impaired by the inclusion of additional windings.

It is accordingly an object of the present invention to obviate many of the deficiencies of known devices and to provide a novel method and apparatus for recharging a storage battery utilizing the windings of an electric motor.

It is another object of the present invention to provide a novel method and battery powered electric motor quickly and easily adapted to recharge the motor from a source of alternating current.

It is a further object of the present invention to provide a novel method and apparatus for interlocking the conversion of the motor to a transformer with access to the external a.c. source connections.

It is yet a further object of the present invention to provide a novel method and apparatus for utilizing the windings of an electric motor as a transformer.

It is still another object of the present invention to provide a novel method and apparatus for obtaining effective brush movement when converting the motor between the transformer and motor modes.

It is yet still another object of the present invention to provide a novel method and apparatus for obtaining effective brush movement upon conversion between motor and transformer modes as a function of the current in the motor windings.

Yet still a further object of the present invention is to provide a novel method and apparatus for reducing brush friction losses when the motor of the present invention is operated in the motor mode below rated load.

THE DRAWINGS

THE DETAILED DESCRIPTION

Figure 1:
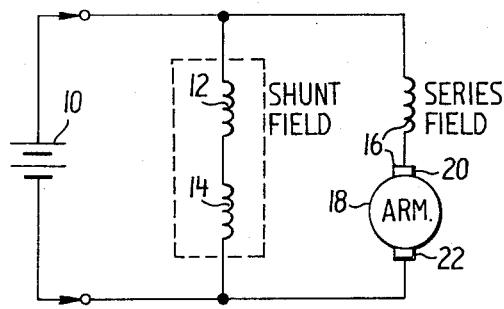
FIG. 1 is a schematic circuit diagram of a battery powered motor.

With reference now to the motor circuit of FIG. 1, a storage battery 10 is selectively applied across a parallel circuit in which shunt field windings 12 and 14 are connected in series in one leg thereof and in which a series field winding 16 is connected in series in the other leg thereof with the armature winding 18 by way of brushes 20 and 22. Connected in this fashion, the circuit comprises a conventional direct current compound motor operated by direct current from the battery 10.

Figure 2:
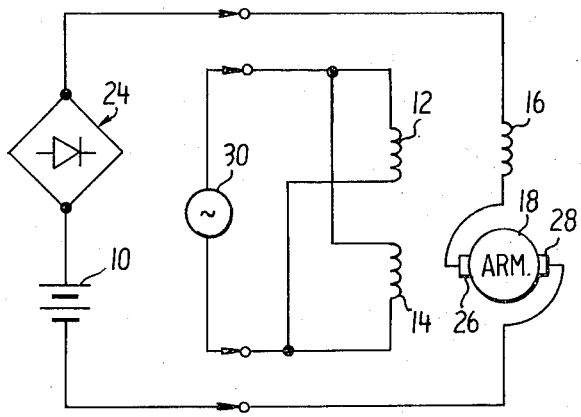
FIG. 2 is a schematic circuit diagram of an electric motor utilized to charge a battery from an a.c. source.

With reference to the battery charging circuit of FIG. 2 where like elements have been accorded a like numerical designation to facilitate an understanding of the present invention, the battery 10 is connected through a suitable conventional rectifier 24 to the series circuit comprising the series field winding 16 and the armature winding 18. Note that the brushes 26 and 28 of the armature are illustrated in a position 90° displaced from the position of the brushes 20 and 22 in FIG. 1.

With continued reference to FIG. 2, a suitable conventional source 30 of alternating current is shown connected across a parallel circuit including the shunt field windings 12 and 14 in the respective legs thereof. The configuration of FIG. 2 is operable to effect charging of the battery 10 from the a.c. source 30 utilizing the windings 12 and 14 as the primary of a transformer and the windings 16 and 18 as the secondary thereof.

The rectifier 24 is, of course, necessary to assure the application of a unidirectional current into the battery 10 for charging purposes. The rectifier 24 may be full or half wave as desired.

Figure 3:
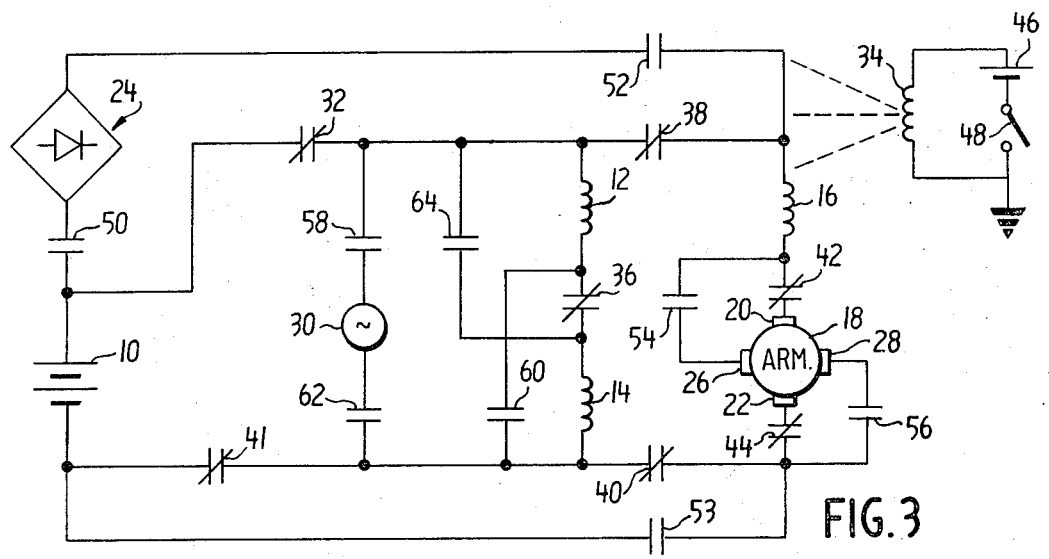
FIG. 3 is a schematic circuit diagram of a circuit for converting the circuit illustrated in FIG. 1 to the circuit illustrated in FIG. 2, and vice versa.

A single circuit for alternatively effecting the electrical connections of FIGS. 1 and 2 is shown in FIG. 3 where like elements have again been accorded a like numerical designation. With reference now to FIG. 3, the battery 10 is connected through the normally closed contacts 32 of a suitable conventional relay 34 to the shunt field windings 12 and 14 which are connected in series by the normally closed contacts 36 of the relay 34. Connected across the shunt field windings 12 and 14 by way of normally closed contacts 38, 40 and 41 is the series field winding 16 and the armature winding 18. Normally closed contacts 42 and 44 are utilized to connect the brushes 20 and 22 into the circuit. With the contacts in the illustrated position, the circuit of FIG. 3 is identical to the circuit of FIG. 1 and the battery 10 may be used to drive the motor.

The relay 34 is schematically illustrated as connected to a battery 46 by the selective operation of a manual switch 48. It is to be understood that the relay 34 might be in a suitable conventional relay with direct current or alternating current and desirably operable to effect the simultaneous operation of all of the switch contacts illustrated in the circuit of FIG. 3.

Upon operation of the relay 34, the circuit of FIG. 3 becomes the circuit illustrated in FIG. 2 by the simultaneous closure of all normally open relay contacts and by the simultaneous opening of all the normally closed contacts illustrated in FIG. 3.

Upon operation of the relay, the battery 10 is connected through the normally open contacts 50, the rectifier 24 and the normally open contacts 52 and 53 to the series field winding 16. The series field winding 16 is in turn connected through normally open contacts 54 and 56 to the armature winding 18 by way of the brushes 26 and 28. The a.c. source 30 is connected across the shunt field winding 12 by way of the normally open contacts 58, 60 and 62 and across the shunt field winding 14 by way of the normally open contacts 58, 64 and 62.

The desirability of preventing the contact of all four brushes at one time will be appreciated. The simultaneous contact of all four brushes may be acceptable in small motors but the acceptability diminshes as the size of the motor increases due to the increased current in the turns encircling the magnetic flux and shorted by the brushes when the motor is operated in the motor mode. For example, the brushes for a motor for driving an electric bicycle may become hot to the touch whereas brushes for a motor of a size compatible with the operation of a golf cart may become cherry red.

Figure 4:
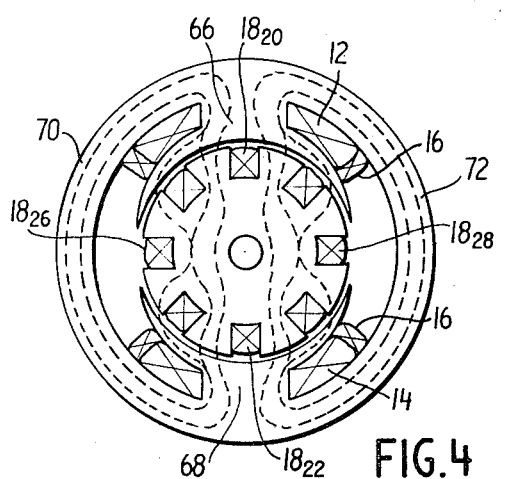
FIG. 4 is a transverse section in elevation taken through an electric motor.

Refer now to FIG. 4 where the physical structure of the circuits of FIGS. 1 and 2 are illustrated in a section taken transversely through a compound motor. The shunt field windings 12 and 14 are illustrated wound respectively about the poles 66 and 68 of the motor. Wound in an overlying relation to the shunt field windings 12 and 14 is the smaller series field winding 16. The armature brushes 20 and 22 of the circuit of FIG. 1 are not illustrated in FIG. 4 but would be connected electrically to the windings $18_{20}$ and $18_{22}$ directly beneath the poles 66 and 68 of the motor. In this position, the brushes 20 and 22 would be in contact with the armature windings $18_{20}$–$18_{22}$ in a position of minimum flux, i.e., null points.

As illustrated, the magnetic flux path for the motor is through the pole 66 and the armature 18 and returned through the legs 70 and 72 of the motor case. While not so illustrated in the interest of clarity, the motor case may be laminated in a manner well known in the art to reduce eddy current losses.

With continued reference to FIG. 4, the physical configuration of the windings is unchanged to provide the circuit of FIG. 2 with the exception that the armature brushes are rotated one-half of the pole pitch to electrically connect the armature windings $18_{26}$–$18_{28}$ in series with the series field winding 16. For the two-pole motor illustrated in FIG. 4, the one-half pole pitch rotation is 90° from the null points to the points of maximum voltage.

Figure 5:
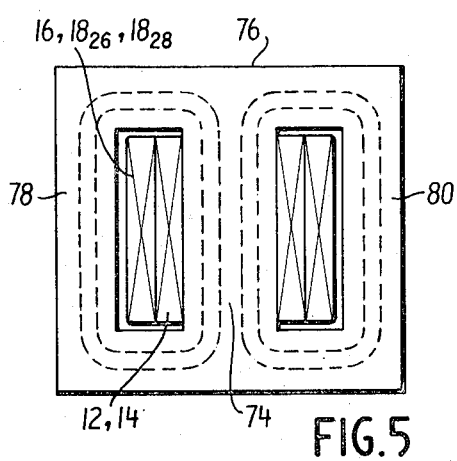
FIG. 5 is a transverse section in elevation of a transformer.

The windings of FIG. 4 when connected in the transformer circuit of FIG. 2 may be considered the equivalent of the transformer illustrated in FIG. 5 wherein the shunt field windings 12 and 14 collectively are wound about the center leg 74 of the transformer core 76. The center leg 74 of the core 76 of FIG. 5 corresponds, of course, to the armature of the motor of FIG. 4 with the outer legs 78 and 80 which complete the magnetic circuit corresponding respectively to the motor case 70 and 72.

The series field winding 16 and the armature windings $18_{26}$ and $18_{28}$ are illustrated in FIG. 5 wound about the center leg 74 of the core 76 in an overlying relation to the shunt field windings 12 and 14 so that the high degree of flux coupling necessary for transformer action is obtained.

Figure 6:
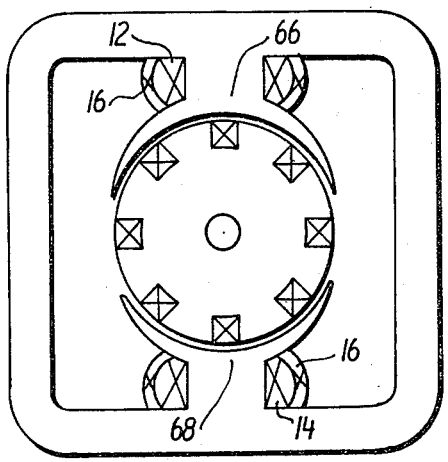
FIG. 6 is a transverse section in elevation taken through an electric motor having a square cross section.

The efficiency of the motor illustrated in FIG. 4 may be enhanced by the utilization of a generally square rather than round cross section motor casing. As illustrated in FIG. 6 where like numerical designations have been utilized in association with like elements, the shunt field windings 12 and 14 may be wound as illustrated about the poles 66 and 68 of the motor. A smaller series field winding 16 may be wound in overlying relation to the shunt field windings 12 and 14 as earlier described in connection with FIG. 4. While the illustration thereof has been omitted in the interest of clarity, the motor case may be laminated in a manner well known in the art to reduce eddy current losses.

The advantages of the generally square physical configuration of the motor case of FIG. 6 includes a reduction in the average length of the turns for a given number thereof since the turns are not forced radially outward about the everbroadening pole shoes 66 and 68 by the curvature of the motor casing. With the reduction in mean turn length, the resistance of the windings is reduced resulting in a reduction in the IR losses. Another advantage of the square physical configuration is that the turns of the windings are in closer proximity and therefore increase the coupling of the magnetic flux.

Figure 7:
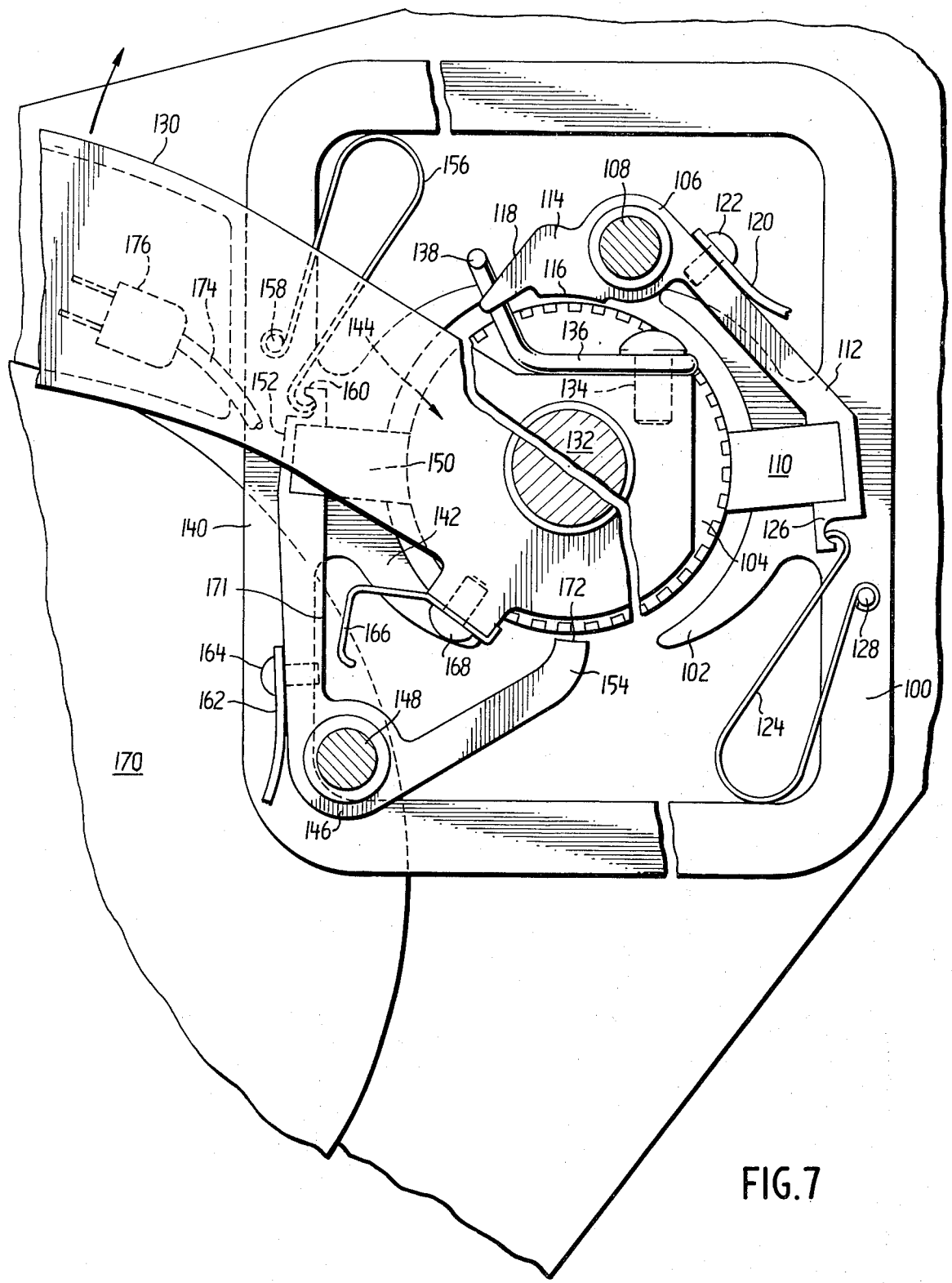
FIG. 7 is a transverse section in elevation taken through the motor transformer of the present invention illustrating two mechanical embodiments for obtaining effective brush movement.

Two practical embodiments for mechanically obtaining effective brush rotation without the physical rotation of the brushes as earlier described are illustrated in cross section in FIG. 7. With reference now to FIG. 7, and with particular attention to the right-hand side of the figure, the square motor case 100 is illustrated in cross section with a pole shoe 102 extending inwardly therefrom in proximity to the armature 104 of the motor. A rocker arm 106 may be pivotably mounted on a pin 108 axially extending from one of the end plates of the motor case and may include a brush 110 mounted in a conventional manner to one arm 112 thereof. The other arm 114 of the rocker arm 106 may include a surface 116 adapted to engage the armature 104 of the motor and may also be provided with a cam surface 118. The rocker arm may be of any suitable conventional electrically conductive material to which an electrical connection may be established by way of a lead 120 and a fastener 122 threadably or otherwise secured to the rocker arm 106 in any suitable conventional manner. The electrical connection of the lead 120 to the rocker arm 106 is desirably near the pivot shaft 108 to minimize the flexing of the lead 120 in the operation of the rocker arm 106.

The surface 116 of the arm 114 may be substituted for the brushes earlier described because the armature 104 is stationary with respect to the motor case 100 when the motor is operated in the transformer mode. Brushes, however, may be used as earlier described but may be smaller in size than the motor mode brushes without harmful effects.

The rocker arm 106 may be normally biased into the motor mode in which the brush 110 is normally in contact with the armature 104. This biasing may be accomplished by any suitable conventional means such as the illustrated spring member 124 connected between an extension 126 on the arm 112 of the rocker arm 106 and a pin 128 carried by the motor case 100.

With continued reference to FIG. 7, the effective mechanical rotation of the brushes as earlier described may be accomplished by the upward movement of an elongated housing member 130 pivotably mounted about the armature shaft 132 and extending upwardly to the left in the figure. In the embodiment illustrated in the left-hand side of FIG. 7, a cylindrical member 134 such as heavy spring wire may be threadably or otherwise secured in any suitable conventional manner to the housing member 130 by means of a fastener 136. This member 134 may be physically configured at the outer end thereof to provide an axially extending portion 138 extending in an overlying relationship to the cam surface 118 of the rocker arm 106.

In operation, the clockwise pivoting of the housing member 130 about the armature shaft 132 will result in the clockwise rotation of the axial portion 138 of the tubular member 134 into pressural engagement with the cam surface 118. The continued clockwise rotation of the housing member 130 through the action of the portion 138 of the tubular member 134 on the cam surface 118 will pivot the rocker arm 106 about the shaft 108 to place the surface 116 of the arm 114 in pressural engagement with the armature 104. This pivoting of the rocker arm 106 in a counterclockwise direction will pivot the brush 110 out of contact with the armature 104.

With continued reference to FIG. 7, an alternative embodiment is illustrated in the left-hand side thereof. As described generally above, the left-hand side 140 of the motor casing 100 is provided with a pole shoe 142 extending into proximity to the left-hand side 144 of the armature 104. A rocker arm 146 may be pivotably mounted on a shaft 148 axially extending from an end plate of the motor. This rocker arm 146 may be of any suitable conventional electrically conductive material and may be provided with a brush 150 at one end 152 thereof. The brush at the other end 154 of the rocker arm 146 may be omitted as earlier discussed and the end 154 provided with an appropriate contact surface 172.

The normal bias of the brush 150 into contact with the left-hand side 144 of the armature for motor mode operation may be provided by means of a spring member 156 connected at one end to a pin 158 on the motor casing and connected at the other end to an extension 160 of the arm 140 of the rocker arm 146. The electrical connection to the rocker arm 146 may be by an electrical conductor 162 threadably or otherwise secured to the rocker arm 146 by means of a suitable conventional fastener 164.

The clockwise movement of the housing member 130 as earlier described may effect the transition from the motor to the transformer mode. A suitable mechanical linkage such as a stiff spring member 166 may be carried by the housing member 130 by way of an appropriate mechanical connection such as the illustrated threaded fastener 168. The clockwise rotation of the housing member 130 about the ahsft 132 of the armature will rotate the member 166 into pressural engagement with the inner surface 171 of the arm 140 and the continued clockwise rotation of the housing member 130 will pivot the rocker arm 146 in a counterclockwise direction to lift the brush 150 from the armature and to place the surface 172 of the arm 154 in contact therewith.

Thus, by either of the embodiments illustrated, the clockwise rotation of the housing member 130 will effect the transition of the motor from the motor mode to the transformer mode without the physical rotation of the brushes.

Figure 8:
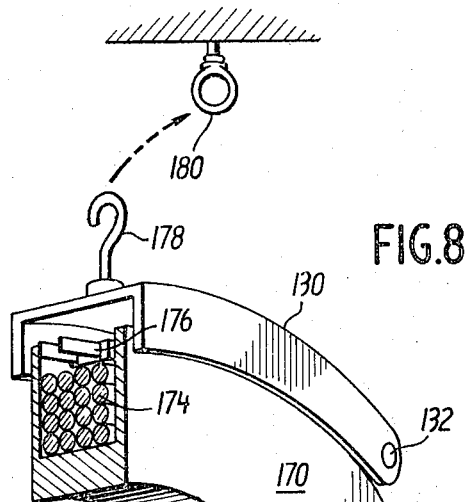
FIG. 8 is a pictorial view illustrating a mechanical interlock between conversion of the motor to a transformer and the access to an external source of alternating current.

The housing member 130 may conveniently be an inverted U-channel in cross section and disposed in an overlying relationship to a reel 170 as is illustrated in FIG. 8. As illustrated in FIGS. 7 and 8, the reel may include an insulated electrical conductor 174 having a conventional connector 176 on the radially outward end thereof. In this manner, the clockwise rotation of the housing member 130 will expose the electrical connector 174 so that the conductor may be unwound from the reel 170 for connection to a suitable source of alternating current. In this manner, it is impossible to have access to the alternating current connector 174 unless the housing member 130 has been rotated to place the motor in the transformer mode. Any suitable conventional securing means such as the illustrated hook 178 and eye 180 may be utilized to maintain the housing member 130 in the clockwise rotation position during the operation of the motor in the transformer mode. The electrical connection at the radially inward end of the conductor 174 may be connected by way of a suitable conventional slip ring structure (not shown) to the electrical connectors 120 and 162 of FIG. 7.

In the two embodiments described in connection with FIG. 7, the position of the rocker arms which convert the motor from the motor mode to the transformer mode is a direct result of the mechanical positioning of the housing member 130. An electrical apparatus may, however, be substituted for this mechanical actuator through the use of suitable conventional solenoids appropriately energized from the current from the external a.c. source. Energization of these solenoids may also serve to connect the external alternating current source to the windings thus providing an electrical interlock. In this manner, the application of alternating current to the windings is proscribed until the effective repositioning of the brushes has been accomplished.

Significant additional advantages are, however, obtained by the use of an electrical actuator whereby the pressure of the brushes may be varied as a function of the load current. As explained in greater detail in my copending application Ser. No. 378,047 for "Motor Field Strength Variable Brush Pressure Apparatus and Method" assigned to the assignee hereof and filed concurrently herewith, the efficiency of operation of the motor in the motor mode is greatly enhanced by reduction of brush pressure at light loads.

Figure 9:
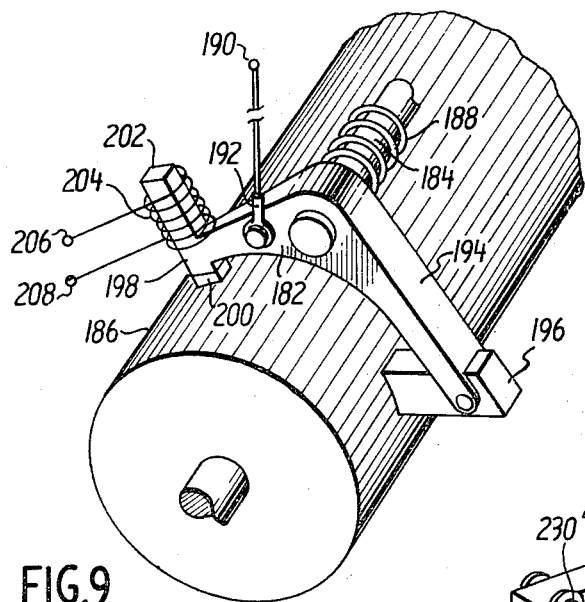
FIG. 9 is a pictorial view illustrating one method of obtaining effective brush movement by electrical means and for varying brush pressure in the motor mode; and, FIG. 10 is a pictorial view illustrating a second embodiment by which a variable brush pressure is obtained in the motor mode.

One circuit for accomplishing this variation in brush pressure is illustrated in FIG. 9 wherein a rocker arm 182 is illustrated as pivotably mounted about a shaft 184 axially disposed in proximity with the armature 186. Bias for the position of the rocker arm 182 into the transformer mode may be obtained by any suitable conventional means such as the illustrated coil spring 188 attached at opposite ends to the shaft 184 and to the rocker arm 182.

An electrical connection may be provided by way of a terminal 190 and a connector 192 to the electrically conductive rocker arm 184. One end 194 of the rocker arm 184 may be provided with a brush 196 and the other end 198 of the rocker arm 192 provided with a brush 200 if desired.

The end 198 of the rocker arm 182 may be provided with an upwardly extending portion 202 which serves as the armature of a solenoid formed by the cooperation of the portion 202 with a coil 204. The coil 204 may be selectively connected by way of terminals 206 and 208 in series with the series field windings 16 of the circuit of FIG. 1. In this manner, an increase in the series field current will increase the magnetic force on the portion 202 of the rocker arm 182 tending to rotate the rocker arm 182 in a clockwise direction. An increase in the field current will thus increase the pressure of the brush 196 on the armature 186. For lighter loads, the rotational force on the rocker arm 184 is proportionally less thereby reducing the brush pressure.

The brush pressure is customarily about four to eight pounds to ensure good ohmic contact for arc prevention. This brush pressure results in a friction loss which is the single greatest loss when the motor is operated at light loads. By way of example, the typical brush friction loss of a one horsepower motor is about 0.1 horsepower or 10 percent. Where, however, the motor is operated at light loads such as 0.2 horsepower, the 0.1 horsepower loss due to brush friction represents 50 percent of the total power. By reducing the brush pressure at light loads, the efficiency of the motor is greatly improved.

Figure 10:
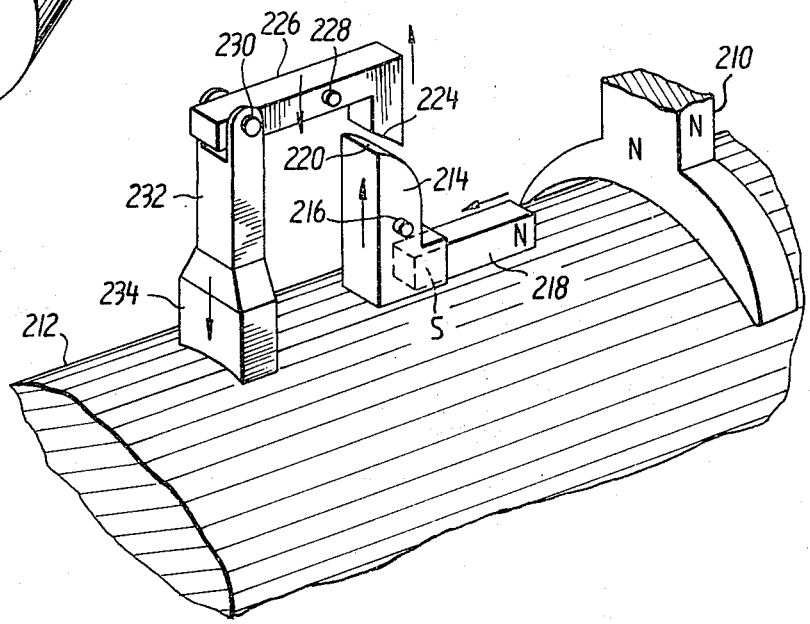

Another method of adjusting brush pressure at light loads is illustrated in FIG. 10. With reference now to FIG. 10, a pole shoe 210 of the motor is illustrated in proximity to the armature 212 of the motor. Displaced axially slightly from the pole shoe 210 is a cam 214 pivotable about a shaft 216 extending transverse to the armature 212. The cam 214 may be provided at the lower end thereof with a small permanent magnet 218 and provided at the other end thereof with a curved surface 220.

The surface 220 of the cam 214 is designed to cooperate with a surface 224 on one end of a pivot arm 226 mounted for rotation about a shaft 228 generally parallel to the shaft 216. The other end of the pivot arm 226 may be pivotably connected by means of a pin 230 to an electrically conductive support means 232 for a brush 234.

As is well known, the operation of the motor in the motor mode results in making the pole shoe a magnetic pole, as a result of the direct current flowing in the windings about the pole shoes. By the appropriate orientation of the polarity of the permanent magnet 218 so that the near end thereof is of the same polarity as the pole shoe 210, the permanent magnet will be repelled from the pole shoe with a force related to the strength of the two magnets. The strength of the permanent magnet 218 is constant but the strength of the pole shoe magnet is a function of the current through the windings thereabout and thus the load on the motor. The force of repulsion is therefore a function of motor load.

The repulsion of the permanent magnet 218 from the pole shoe 210 will pivot the cam 214 in a clockwise direction about the shaft 218. The clockwise pivoting of the cam 214 will in turn force the counterclockwise pivoting of the rocker arm 226 about the shaft 228 through the pressural engagement of the surfaces 222 and 224. The counterclockwise pivoting of the rocker arm 226 will in turn exert a downward pressure on the brush 234. The pressure on the brush 234 thus becomes variable as a function of the strength of the pole shoe magnet 210 and thus a function of the motor load.

ADVANTAGES AND SCOPE OF THE INVENTION

The advantages of the present invention will be readily apparent to one skilled in the art to which the invention pertains from the foregoing detailed description of preferred embodiments. The conversion of an electric motor to a transformer for the purpose of charging the battery from which the battery is normally operated represents a significant savings in both space and weight in the elimination of the customary transformer associated with conventional battery chargers.

This conversion of a motor from a motor to a transformer mode may be accomplished in accordance with the present invention by the physical rotation of the brushes, by the operation of electrical switch contacts, or by the use of a pivotal or other mechanism which mutually exclusively positions separate brushes in contact with the motor armature to achieve effective brush rotation.

The position of the pivotal mechanism may be controlled mechanically to provide a fail-safe method of operation by requiring the conversion of the motor to the transformer mode as a prerequisite to access to an external alternating current source. Moreover, a significant reduction in brush friction losses at less than rated loads has also been achieved through the use of the load current to control the position of the pivotal mechanism and thus the pressure of the brushes on the armature. The efficiency of the motor is additionally increased by the utilization of a generally square cross section motor casing which reduces the resistance losses of the windings and increases the flux coupling characteristics thereof.

While several embodiments have been described, it is to be understood that the present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus comprising:
   a two-pole compound d.c. motor having an armature winding, two shunt field windings, and a series field winding;
   a storage battery;
   a rectifier;
   an a.c. source; and,
   means for selectively modifying the effective position of the armature brushes of said motor between two predetermined positions and for selectively connecting said battery, said rectifier, said a.c. source, and said armature, series field, and shunt field windings to form one of two predetermined circuits,
      the first of said two predetermined circuits including said battery connected across a parallel circuit having in one leg thereof a series circuit including said two shunt field windings and in the other leg thereof a series circuit including said series field winding and said armature winding, the armature brushes of said motor being in a first one of said two predetermined positions whereby said motor may be driven by said battery,
      the second of said two predetermined circuits including said a.c. source connected in parallel with said two shunt field windings and further including said battery, said rectifier, said series field winding and said armature winding connected in series, the armature brushes of said motor being in the second of said two predetermined positions whereby said battery may be charged from said a.c. source with said parallel connected shunt field windings and said series connected series field and armature windings serving respectively as the primary and secondary windings of a transformer.

2. The apparatus of claim 1 wherein said two predetermined positions of the armature brushes of said motor are displaced on said armature winding by an angle of approximately 90°.

3. The apparatus of claim 2 wherein said rectifier is a full wave rectifier.

4. The apparatus of claim 3 wherein said two shunt field windings are substantially equal in ampere-turns.

5. The apparatus of claim 2 including means for varying the pressure of the armature brushes when in said first predetermined position as a function of motor load.

6. Apparatus comprising:
   an electric motor having armature and field windings and armature brushes electrically connected so that the armature winding encircles minimum electromagnetic flux passing through the armature;
   first switch means by which a battery may selectively be electrically connected to said windings;
   a rectifier;
   second switch means by which a source of direct current may selectively be electrically connected to one of said windings; and,
   means for selectively electrically connecting said armature brushes so that the armature winding encircles maximum electromagnetic flux passing through the armature.

7. The apparatus of claim 6 including manually operable means for simultaneously operating said first switch means, said second switch means, and said means for electrically connecting said armature brushes.

8. The apparatus of claim 7 wherein said means for electrically connecting said armature brushes to encircle maximum and minimum electromagnetic flux includes means for physically displacing said armature brushes by about one-half of the pole pitch of the motor.

9. The apparatus of claim 7 wherein said means for electrically connecting said armature brushes to encircle maximum and minimum electromagnetic flux includes two sets of armature brushes and switch means for the mutually exclusive electrical connection of said sets of armature brushes.

10. The apparatus of claim 6 wherein said means for electrically connecting said armature brushes to encircle maximum and minimum electromagnetic flux includes means for physically displacing said armature brushes by about one-half of the pole pitch of the motor.

11. The apparatus of claim 6 wherein said means for electrically connecting said armature brushes to encircle maximum and minimum electromagnetic flux includes two sets of armature brushes and switch means for the mutually exclusive electrical connection of said sets of armature brushes.

12. The apparatus of claim 11 including means for preventing the simultaneous operable contact of said two sets of armature brushes with the armature.

13. The apparatus of claim 6 wherein said means for electrically connecting said armature brushes to encircle maximum and minimum electromagnetic flux includes:
   a rocker arm pivotable from a first position in which one end thereof pressurally engages the motor armature to a second position in which the other end thereof pressurally engages the motor armature, said one end including an armature brush; and,
   means for selectively controlling the position of said rocker arm.

14. The apparatus of claim 13 wherein said means for selectively controlling the position of said rocker arm includes:
   means for biasing said rocker arm into one of said first and second positions; and,
   lever means pivotable about the axis of the motor for mechanically overcoming the bias of said biasing means to pivot said rocker arm to the other of said first and second positions.

15. The apparatus of claim 14 wherein said second switch means includes an elongated electrical conductor having a connector adapted for connection to a source of alternating current on one end thereof; and,
   including means for preventing the connection of said conductor to said source of alternating current when said rocker arm is in a predetermined one of said first and second positions.

16. The apparatus of claim 13 wherein said means for selectively controlling the position of said rocker arm includes a solenoid means.

17. The apparatus of claim 16 wherein the current applied to said solenoid means is related to motor load whereby the force applied to said rocker arm when in a predetermined one of said first and second positions is related to motor load.

18. The apparatus of claim 16 wherein said second switch means includes an elongated electrical conductor having a connector adapted for connection to a source of alternating current; and,
    including means responsive to the current applied to said solenoid means for preventing the application of alternating current from said source to the windings of said motor.

19. The apparatus of claim 13 wherein said means for selectively controlling the position of said rocker arm includes permanent magnet means adjacent a pole of said motor.

20. Apparatus comprising:
    a plural pole motor having an armature winding and field windings;
    a storage battery;
    a pair of input terminals;
    a rectifier; and,
    means for selectively effectively displacing the armature brushes of said motor by one-half the pole pitch of said motor and for selectively connecting said battery, said rectifier and said armature and field windings to form one of two predetermined circuits,
        the first of said two predetermined circuits including said battery connected across a parallel circuit having said field windings in one leg thereof and said armature windings in the other leg thereof whereby said motor may be driven by said battery,
        the second of said two predetermined circuits including said battery, said rectifier and one of said armature and field windings connected in series and further including the other of said armature and field windings connected to said input terminals, the armature brushes of said motor being displaced by one-half the pole pitch of said motor whereby said battery may be charged from alternating current applied to said input terminals with said armature and field windings serving as the primary and secondary windings of a transformer.

21. The apparatus of claim 20 wherein said effective armature brush displacing and said selective connecting means includes means for selectively preventing the application of an alternating current to said input terminals.

22. The apparatus of claim 21 wherein the case of said motor is generally square in cross section and laminated to reduce eddy current losses.

23. The apparatus of claim 21 wherein said motor includes a series field winding wound in an overlying relationship to said field windings; and,
    wherein said series field winding is connected in series with said armature winding in both of said two predetermined circuits.

24. The apparatus of claim 20 wherein the case of said motor is generally square in cross section and laminated to reduce eddy current losses.

25. A method of utilizing the windings of a d.c. motor as a transformer to charge a battery from an a.c. source comprising the steps of:
    a. connecting the battery to one of the armature and field windings of the motor through a rectifier;
    b. connecting the other of the armature and field windings of the motor to a source of alternating current; and,
    c. effectively positioning the armature brushes of the motor to a position where the armature winding encircles maximum flux so that alternating current from the a.c. source applied to said one of the motor windings is transformer coupled to said other of the motor windings for aplication to the battery through the rectifier.

26. The method of claim 25 wherein said one winding is the armature winding of the motor and wherein said other winding is the field winding of the motor.

27. The method of claim 26 wherein the effective positioning of the armature brushes of the motor is obtained by physically displacing the brushes by one-half the pole pitch of the motor.

28. The method of claim 25 wherein the effective positioning of the armature brushes of the motor is obtained by physically displacing the brushes by one-half the pole pitch of the motor.

29. The method of claim 25 wherein the effective positioning of the armature brushes of the motor is obtained by removing one set of armature brushes from pressural engagement with the armature while substantially simultaneously pressurally engaging the armature with a second set of armature brushes.

30. The method of claim 25 including the step of modifying the pressure with which the armature brushes of the motor engage the motor armature as a function of motor load.

31. A method of utilizing the armature and field windings of an electric motor as a transformer comprising the steps of:
    a. effectively rotating the armature brushes of the motor by one-half the pole pitch of the motor;
    b. electrically connecting the armature winding to a pair of output terminals through the effectively rotated brushes; and,
    c. electrically connecting the field winding to a pair of input terminals whereby said one winding is the armature winding of the motor and whereby said other winding is the field winding of the motor.

32. A method of utilizing the armature and field windings of an electric motor as a transformer comprising the steps of:
    a. effectively displacing the armature brushes of the motor from the null points to the points of maximum voltage;
    b. electrically connecting the armature winding to a pair of output terminals through the effectively displaced brushes; and,
    c. electrically connecting the field winding to a pair of input terminals whereby current applied to the input terminals is inductively coupled to the output terminals through the field and armature windings.

* * * * *